United States Patent
Sato

(10) Patent No.: US 8,992,059 B2
(45) Date of Patent: Mar. 31, 2015

(54) VEHICLE LIGHTING DEVICE WITH FIRST AND SECOND LIGHT SOURCES

(75) Inventor: Koji Sato, Hadano (JP)

(73) Assignee: Stanley Electric Co., Ltd., Tokyo (JP)

( * ) Notice: Subject to any disclaimer, the term of this patent is extended or adjusted under 35 U.S.C. 154(b) by 126 days.

(21) Appl. No.: 13/593,121

(22) Filed: Aug. 23, 2012

(65) Prior Publication Data
US 2013/0051049 A1 Feb. 28, 2013

(30) Foreign Application Priority Data
Aug. 25, 2011 (JP) .................... 2011-183197

(51) Int. Cl.
| B60Q 1/00 | (2006.01) |
| B60Q 1/26 | (2006.01) |
| F21V 13/02 | (2006.01) |
| F21S 8/10 | (2006.01) |
| F21V 8/00 | (2006.01) |

(52) U.S. Cl.
CPC ............ *F21S 48/2237* (2013.01); *B60Q 1/2607* (2013.01); *F21S 48/215* (2013.01); *F21S 48/22* (2013.01); *F21S 48/2268* (2013.01); *F21S 48/2281* (2013.01); *G02B 6/001* (2013.01); *G02B 6/002* (2013.01); *G02B 6/0038* (2013.01); *G02B 6/0068* (2013.01)
USPC ............ 362/511; 362/509; 362/518; 362/522

(58) Field of Classification Search
USPC ................. 362/511, 510, 459, 541, 27, 31, 32
See application file for complete search history.

(56) References Cited

U.S. PATENT DOCUMENTS

| 7,278,768 | B2 * | 10/2007 | Gasquet | 362/539 |
| 7,695,175 | B2 * | 4/2010 | Futami | 362/511 |
| 2005/0276565 | A1 * | 12/2005 | Bourdin et al. | 385/146 |
| 2006/0067084 | A1 * | 3/2006 | Stefanov | 362/511 |
| 2006/0146555 | A1 * | 7/2006 | Inaba | 362/494 |
| 2010/0008088 | A1 * | 1/2010 | Koizumi et al. | 362/235 |
| 2011/0103084 | A1 * | 5/2011 | Zwick | 362/511 |
| 2011/0242831 | A1 * | 10/2011 | Okui et al. | 362/511 |
| 2013/0003398 | A1 * | 1/2013 | Godbillon | 362/511 |

FOREIGN PATENT DOCUMENTS

| CN | 201800627 U | * | 4/2011 |
| JP | 2008-68787 A | | 3/2008 |
| JP | 2009-259557 A | | 11/2009 |

OTHER PUBLICATIONS

English abstract of CN 201800627 U to Huang.*

* cited by examiner

*Primary Examiner* — Sikha Roy
(74) *Attorney, Agent, or Firm* — Kenealy Vaidya LLP

(57) ABSTRACT

A vehicle lighting device includes first and second light sources and a light guide lens that is elongate and extending along a direction oblique to a front-back direction of a vehicle. The first light source faces with a back end portion of the lens in a longitudinal direction of the lens. The second light source is arranged close to a front end portion of the lens in the longitudinal direction to emit light toward a back surface of the lens. The lens has a plurality of cut portions in the back surface. The cut portions are arranged parallel with each other in the longitudinal direction, internally reflect the light emitted from the first light source and enters the lens through the back end portion to a forward direction of the vehicle, and refract the light emitted from the second light source and enters the lens to the forward direction.

4 Claims, 10 Drawing Sheets

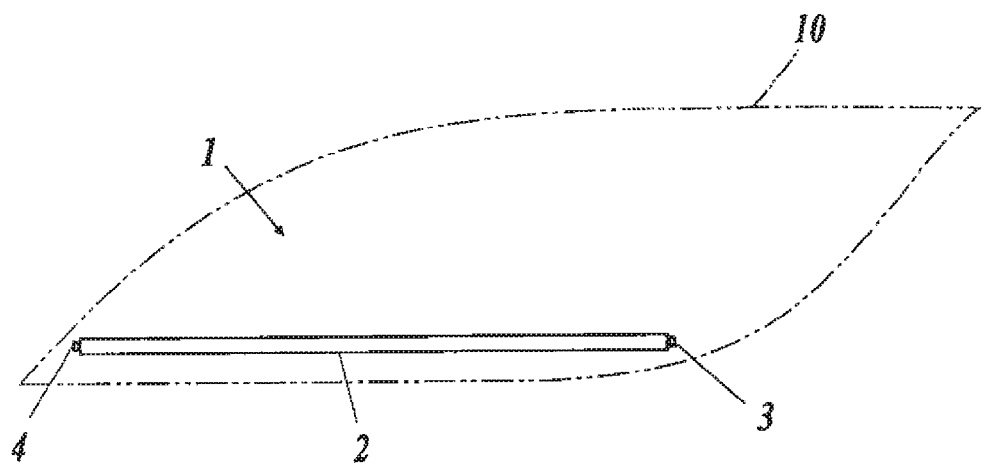
FIG.1
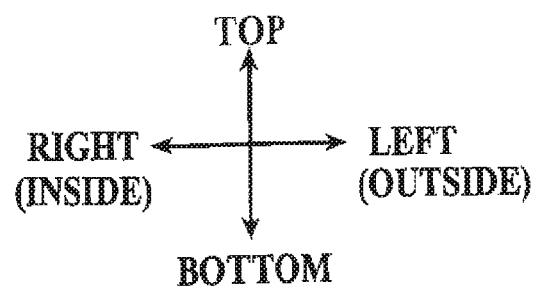

FIG. 7
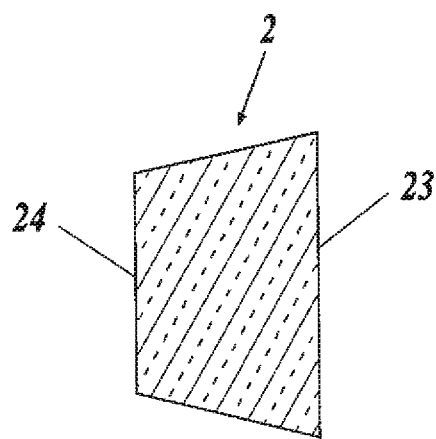
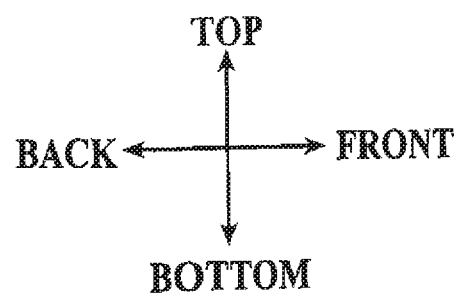

FIG. 8
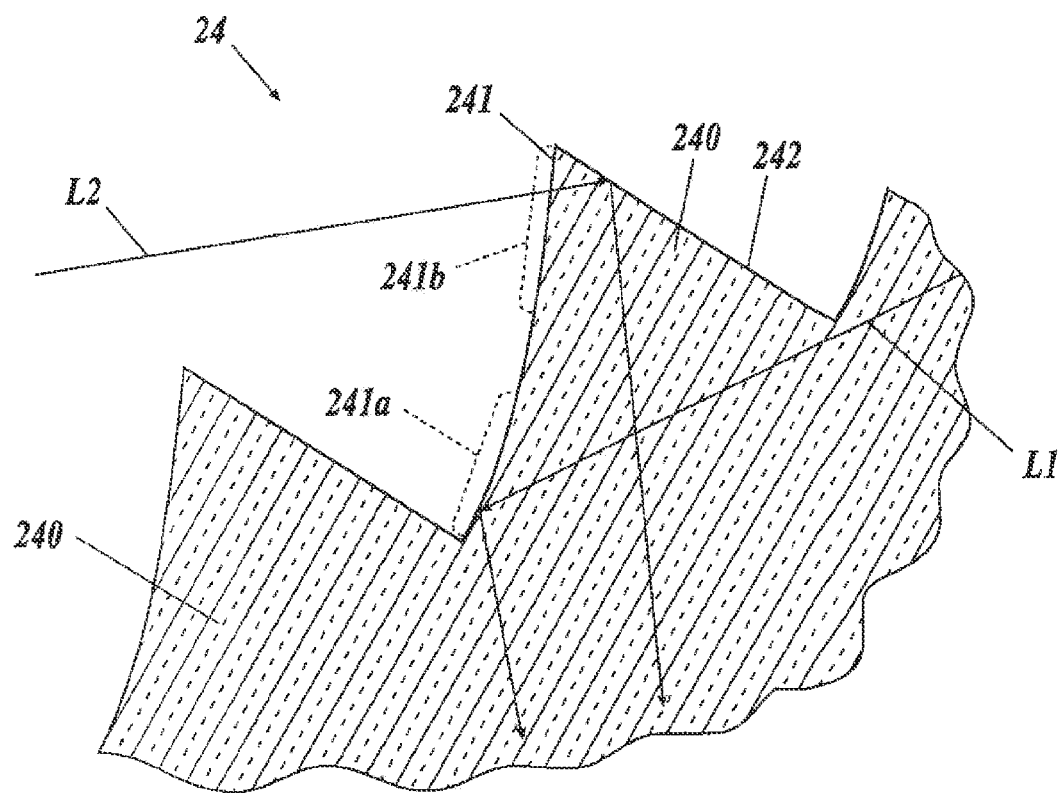
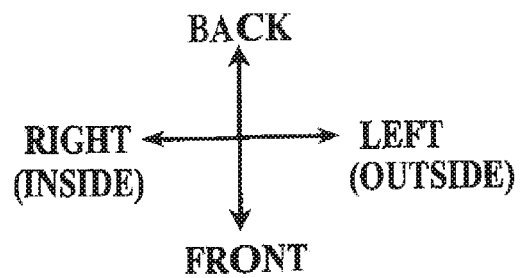

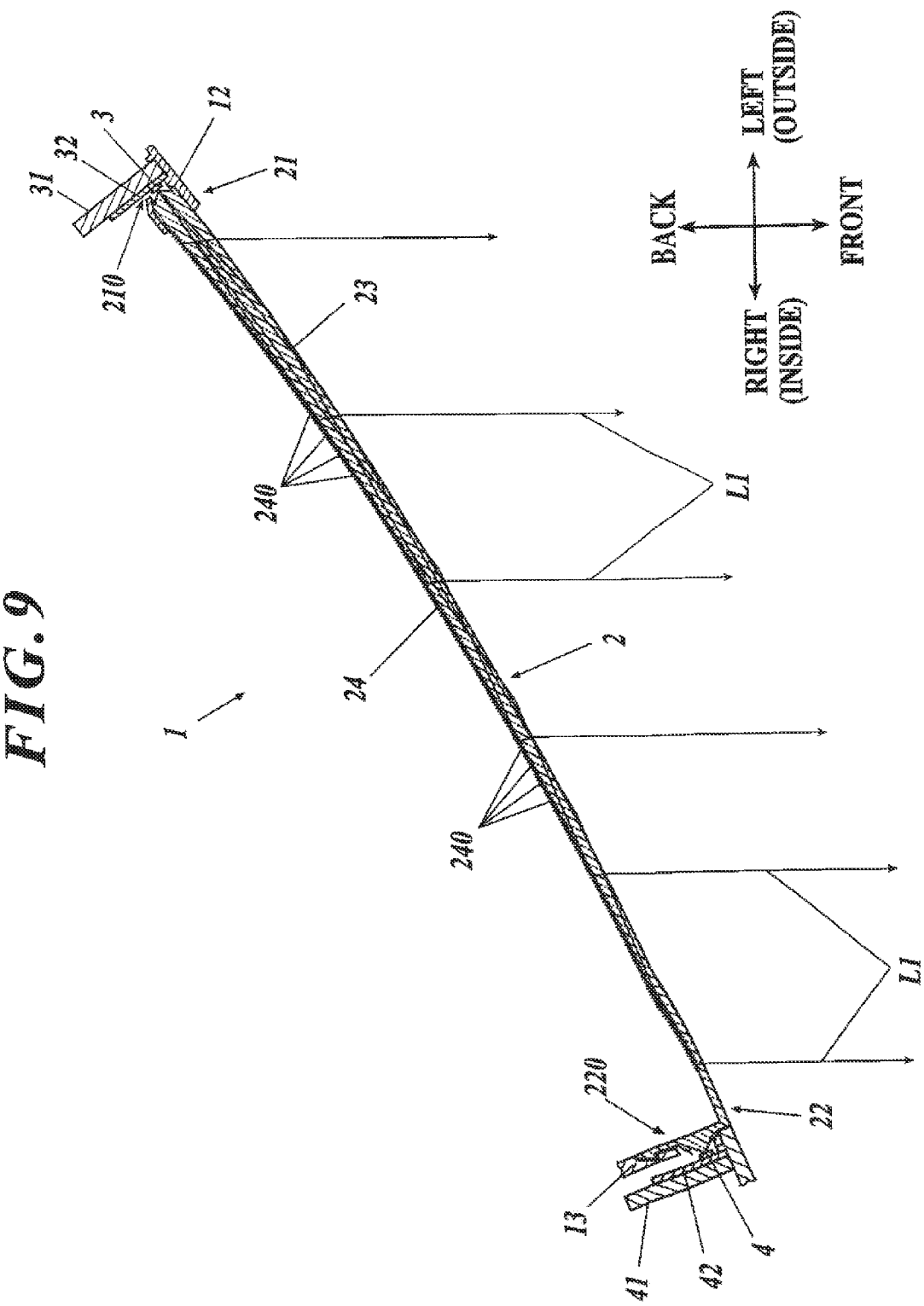

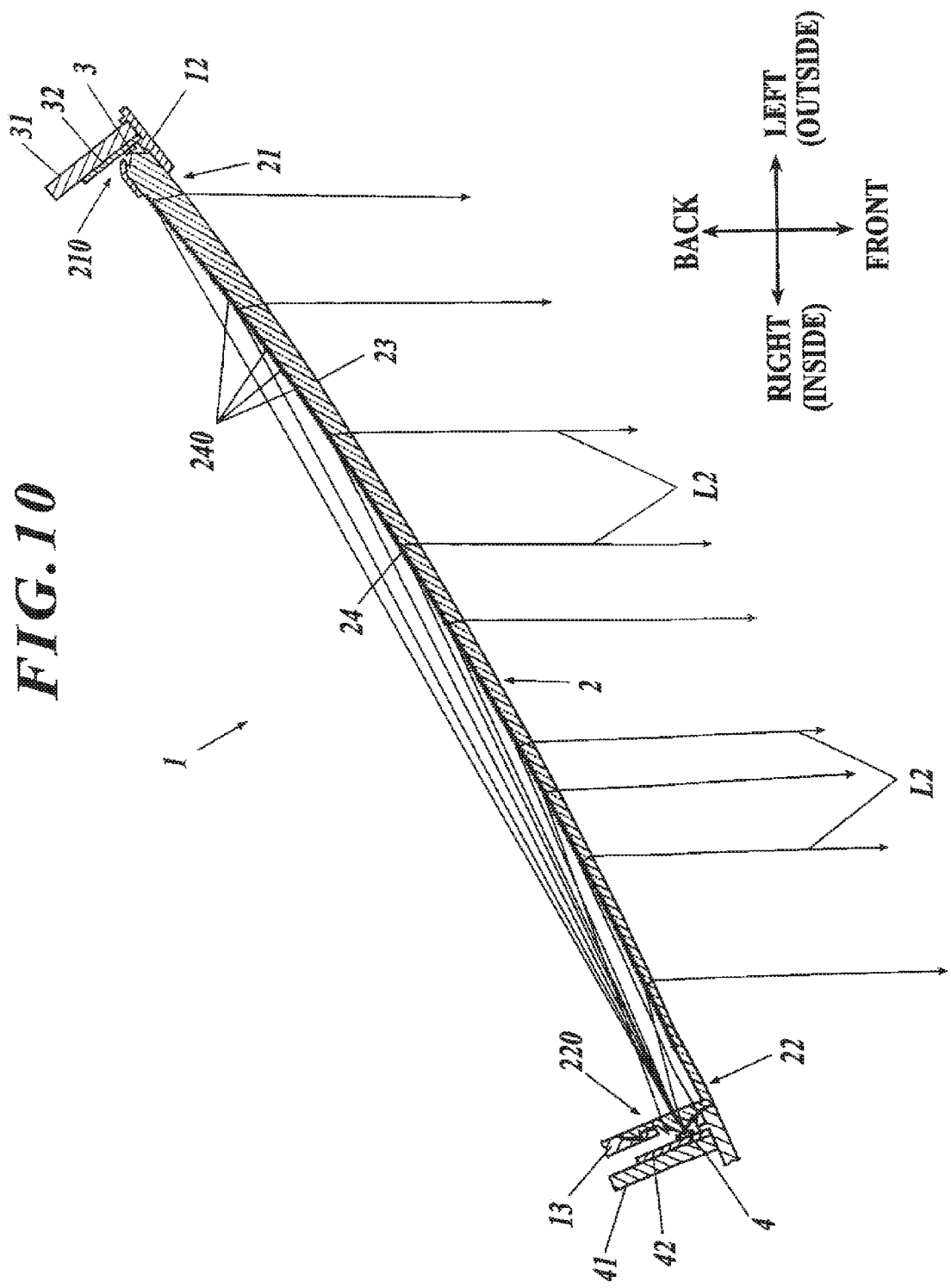

VEHICLE LIGHTING DEVICE WITH FIRST AND SECOND LIGHT SOURCES

This application claims the priority benefit under 35 U.S.C. §119 of Japanese Patent Application No. 2011-166163 filed on Aug. 25, 2011, which is hereby incorporated in its entirety by reference.

FIELD

The presently disclosed subject matter relates to a vehicle lighting device.

DESCRIPTION OF RELATED ART

Heretofore, there is known a vehicle lighting device that emits light from the whole length of a long light guide lens and is used as a signal blinker or the like for an automobile (see, for example, Japanese Patent Application Laid-Open Publication No. 2008-68787 and Japanese Patent Application Laid-Open Publication No. 2009-259557). Such kind of vehicle lighting device as described above guides lights, which enter into the lens from both end faces of the lens in a longitudinal direction thereof, along the longitudinal direction, internally reflects the lights by lens cut portions that are formed in a back face of the lens to emit light from a front surface of the lens, and thereby makes the front surface of the lens emit light.

However, the above described conventional vehicle lighting device cannot emit light, which enters into the lens from one of the end faces of the lens in the longitudinal direction, forwardly, if the lens is arranged along a direction oblique to a front-back direction of the device.

Specifically, as shown in FIG. 11A, in the case where a long light guide lens 51 is obliquely arranged so that a left side (outer side of the vehicle) of the lens gradually obliques backward with respect to a right side (inner side of the vehicle) of the lens, and a front surface 51a of the lens 51 is emitted by two light emitting diodes (LEDs) 52, 53 that face to face with both end faces of the lens in a longitudinal direction thereof, respectively, the light from the LED 52 can be internally reflected forward by lens cut portions, which are formed on a back surface 51b of the lens 51, to be output from the front surface 51a without any difficulties, since an output direction of the light from the LED 52, in the two LEDs 52, 53, disposed on a back side of the lens 51 in the longitudinal direction is not so largely different from a final output direction (forward direction) from the front surface 51a of the lens 51.

On the other hand, since an output direction of the light emitted from the LED 53, in the two LEDs 52, 53, disposed on the front side of the lens 51 in the longitudinal direction is obliquely backward, the light from the LED 53 must be internally reflected at a sharp angle by the lens cut portions on the back surface 51b if the light is to be directed toward the final output direction (forward direction) from the front surface 51a. However, as shown in FIG. 11B, it is difficult to internally reflect the light from the LED 53 at a sharp angle by the lens cut portions, thus the light backwardly escapes through the lens cut portions.

In this manner, the above-described conventional vehicle lighting device cannot forwardly output the light from the LED 53, in the two LEDs 52, 53, disposed toward an obliquely backward direction, thus cannot make the front surface 51a of the lens 51 emit light forwardly. Specifically, as shown in FIG. 11A, in the case where the light guide lens 51 is curved to be forwardly convexed, the above problem becomes conspicuous since the reflection angle needed to forwardly reflect the light from the LED 53 becomes sharper as the distance from the LED 53 becomes larger.

SUMMARY

The presently disclosed subject matter was made in view of the above to solve at least one of the above problems, and aims to provide a vehicle lighting device which can make a front surface of a light guide lens, which is long and extending along an oblique direction with respect to a front-back direction of a vehicle, forwardly emit light by the lights from two light sources that are disposed close to both end portions of the light guide lens in a longitudinal direction, respectively.

According to an aspect of the presently disclosed subject matter, there is provided a vehicle lighting device, including: a first light source and a second light source; and a light guide lens that is elongate and extending along a direction oblique to a front-back direction of a vehicle, wherein the first light source is arranged to face with a back end portion of the light guide lens in a longitudinal direction of the light guide lens, the second light source is arranged close to a front end portion of the light guide lens in the longitudinal direction to emit light toward a back surface of the light guide lens, the light guide lens has a plurality of lens cut portions in the back surface thereof, the lens cut portions being arranged parallel with each other in the longitudinal direction, and the plurality of lens cut portions are formed to internally reflect the light, which is emitted from the first light source and enters into the light guide lens through the back end portion, to a forward direction of the vehicle, and are formed to refract the light, which is emitted from the second light source and enters into the light guide lens to be internally reflected to the forward direction of the vehicle.

The light guide lens can be formed to have a backward curvature from the front end portion to the back end portion.

A thickness of the light guide lens between the back surface and a front surface can be thinner in the forward than in the backward.

The lens cut portions can be formed in the shape of saw tooth that are parallely arranged in the longitudinal direction of the light guide lens and have first and second prism faces arranged in foreside and backside of the longitudinal direction, respectively, an upstroke portion of the first prism face is formed to internally reflect the light, which is emitted from the first light source and enters into the light guide lens through the back end portion, to a forward direction of the vehicle, a tip portion of the first prism face is formed to allow the light emitted from the second light source to enter into the light guide lens, and the second prism face is formed to internally reflect the light, which enters into the light guide lens from the tip portion of the first prism face, to the forward direction of the vehicle.

Each of the first and second light sources can emit light of a plurality of colors.

BRIEF DESCRIPTION OF THE DRAWINGS

FIG. 1 is a front view illustrating a vehicle lighting device according to an embodiment of the presently disclosed subject matter;

FIG. 7 is a sectional view taken along the line III-III of FIG. 2;

FIG. 8 is an enlarged sectional view showing lens cut portions according to the embodiment;

FIG. 9 is a view showing the optical paths of the light from a first LED according to the embodiment;

FIG. 10 is a view showing the optical paths of the light from a second LED according to the embodiment.

DETAILED DESCRIPTION OF THE EXEMPLARY EMBODIMENTS

Hereinafter, an exemplary embodiment of the presently disclosed subject matter will be described with reference to the accompanying drawings.

Figure 2:
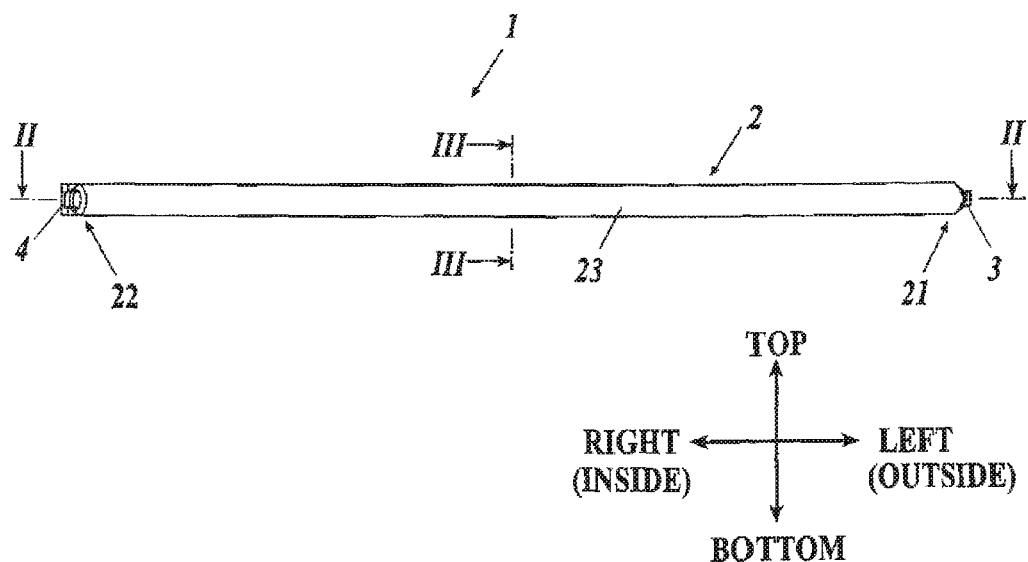
FIG. 2 is a front view illustrating the vehicle lighting device of the embodiment.
Figure 3:
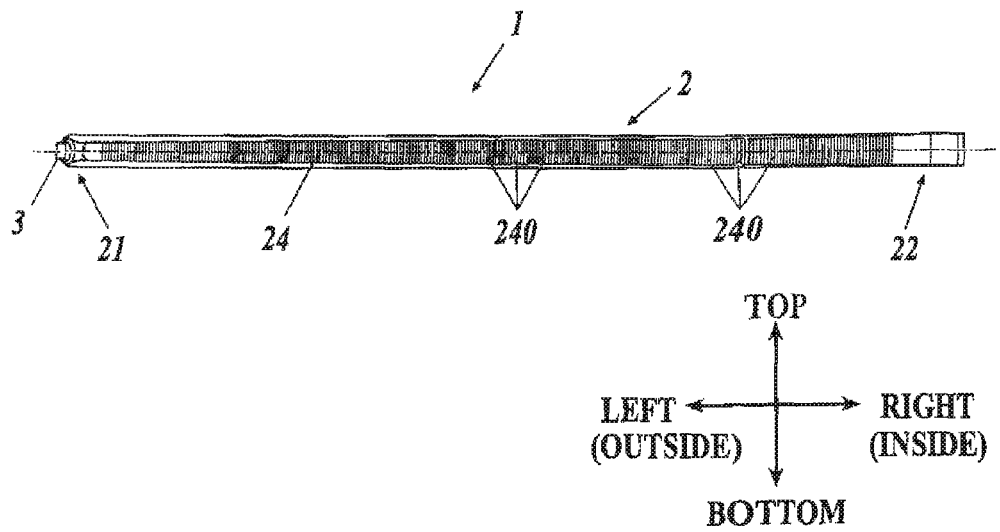
FIG. 3 is a back view illustrating the vehicle lighting device according to the embodiment.
Figure 4:
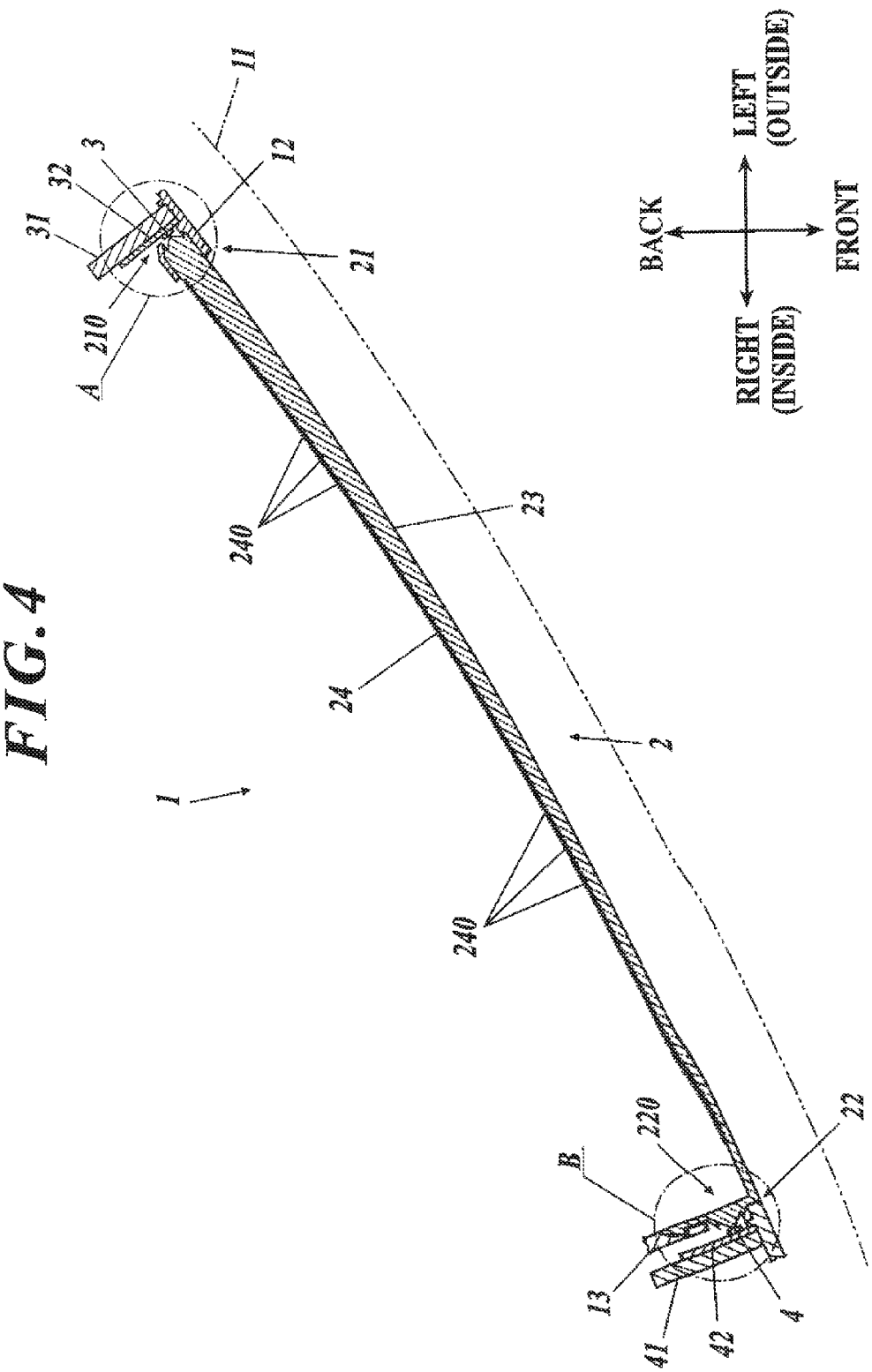
FIG. 4 is a sectional view taken along the line II-II of FIG. 2.
Figure 5:
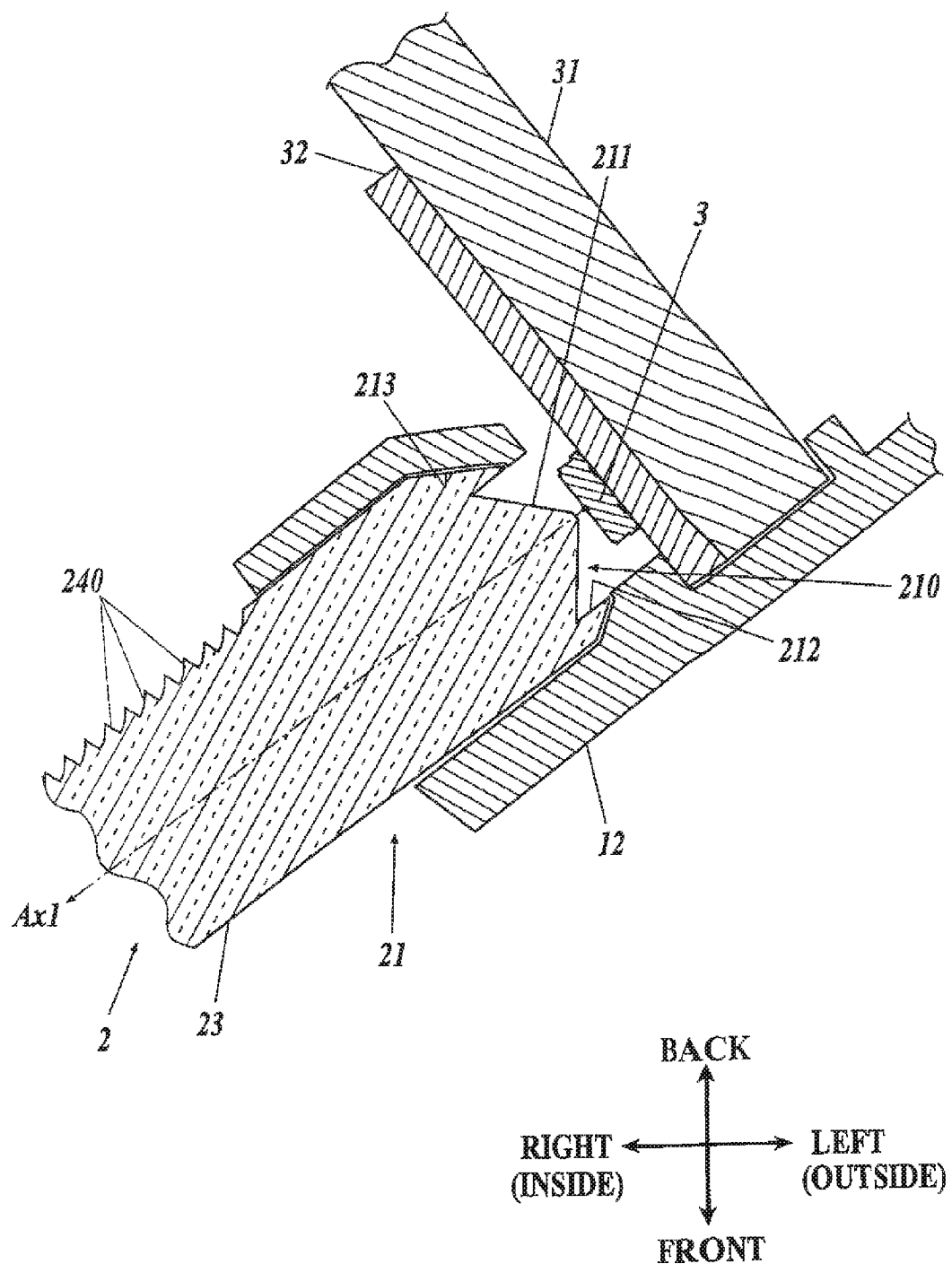
FIG. 5 is an enlarged view showing an area A in FIG. 4.
Figure 6:
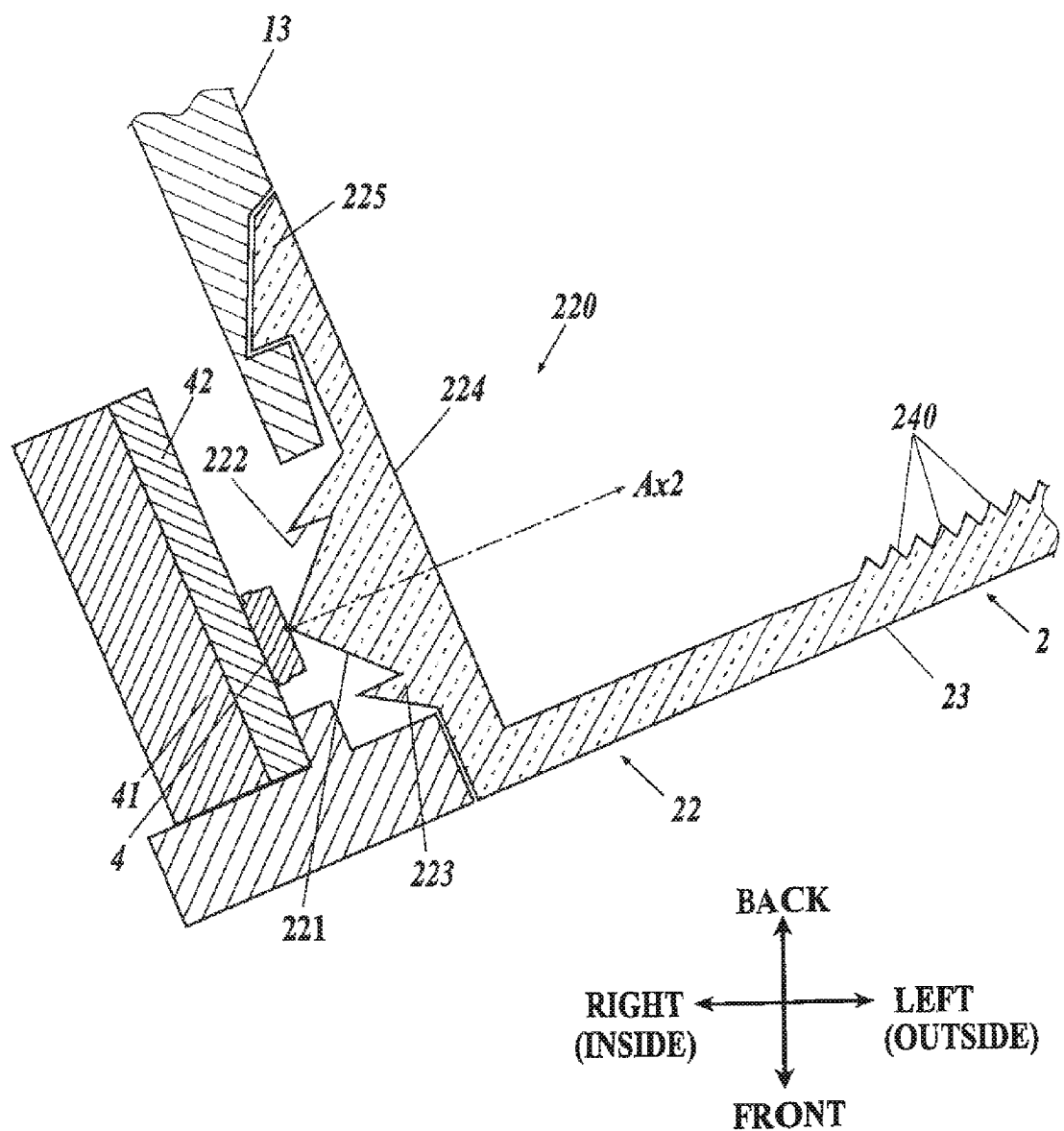
FIG. 6 is an enlarged view showing an area B in FIG. 4.
Figure 11A:
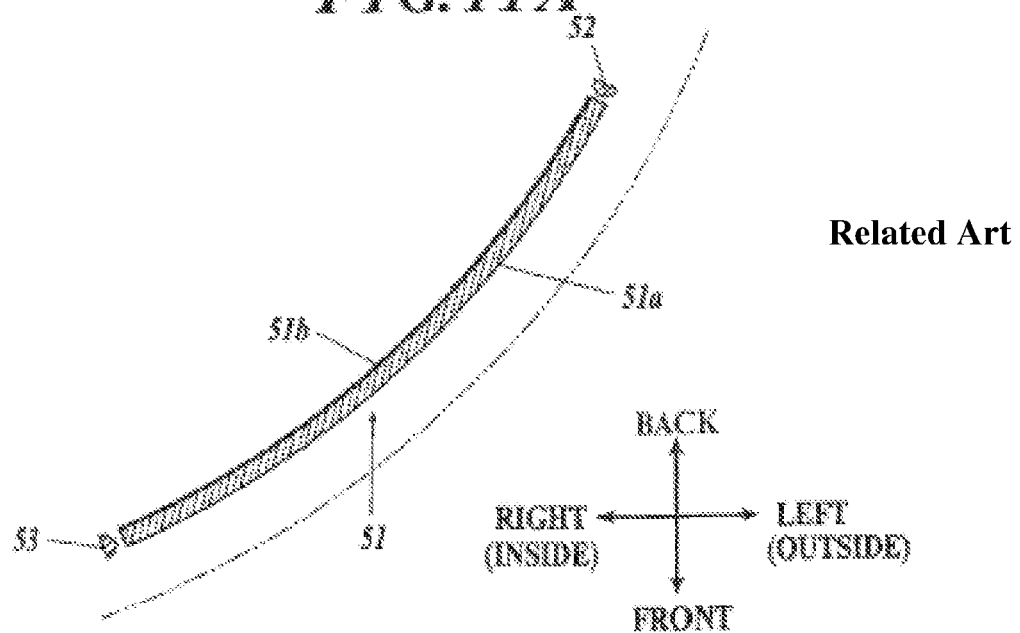
FIGS. 11A and 11B are views for explaining a conventional vehicle lighting device.
Figure 11B:
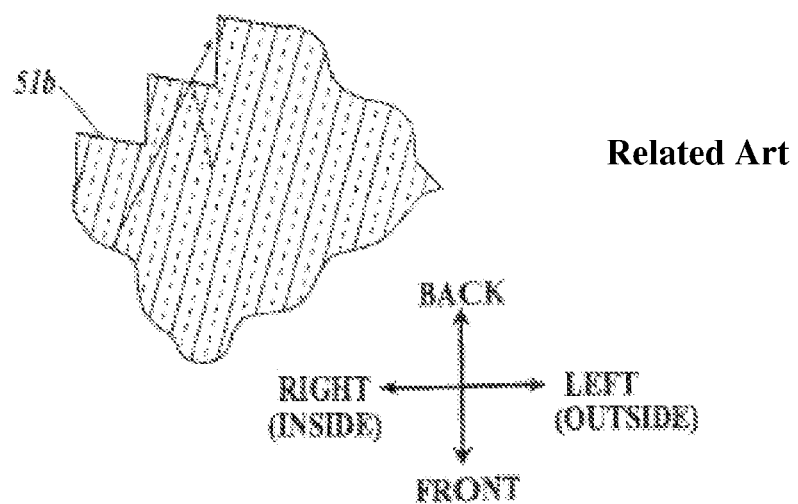

FIGS. 1 and 2 are front views each illustrating a vehicle lighting device 1 according to an embodiment of the presently disclosed subject matter; FIG. 3 is a back view illustrating the vehicle lighting device 1 according to the embodiment; FIG. 4 is a sectional view taken along the line II-II of FIG. 2; FIGS. 5 and 6 are enlarged views showing areas A and B in FIG. 4, respectively; and FIG. 7 is a sectional view taken along the line III-III of FIG. 2.

In the embodiment, the descriptions of "front", "back", "left", "right", "top" and "bottom" correspond to respective directions when viewed from the vehicle lighting device 1, that is, viewed from a vehicle onto which the vehicle lighting device 1 is mounted.

As shown in FIGS. 1 to 4, the vehicle lighting device 1 is disposed at a lower part of a headlamp 10 which is mounted on a left side of a front part of the non illustrated vehicle, and has a long light guide lens 2 and two light emitting diodes (LEDs) 3, 4.

The light guide lens 2 is disposed along a direction oblique to a front-back direction of the vehicle to follow a front surface of an outer lens 11 of the headlamp 10 in a plane approximately perpendicular to a vertical direction. More specifically, the light guide lens 2 is arranged in a direction having an oblique angle of approximately 30 degrees to a right-and-left direction. The light guide lens 2 extends along the direction oblique toward a right side (inner side of the vehicle) from a back end portion 21 in a backside of the longitudinal direction of the lens 2 to a front end portion 22 in a front side of the longitudinal direction of the lens 2. The light guide lens 2 is formed to be curved backwardly from the front end portion 22 to the back end portion 21.

As shown in FIG. 5, among the two LEDs 3 and 4, a first LED 3 (first light source) is arranged close to the back end portion 21 of the lens 2 so as to face to the back end portion 21. The first LED 3 is mounted on a substrate 32, which is fixed to a heatsink 31, in a state that an optical axis Ax1 of the LED 3 is directed to a forward right direction having an oblique angle of approximately 35 degrees to the right-and-left direction.

At the end portion 21 of the light guide lens 2, there is formed an optical entrance 210 for focusing the light emitted from the LED 3 toward the optical axis Ax1 and for allowing the light to enter into the light guide lens 2. The optical entrance 210 has a first entrance face 211, a second entrance face 212 and a reflecting surface 213.

The first entrance face 211 is formed to be a convex bulging toward the first LED 3 with the optical axis Ax1 being a rotationally-symmetrical axis, and is arranged so that the first LED 3 is positioned at a focal point of the first entrance face 211. The first entrance face 211 is formed to refract the light emitted from the first LED 3 toward the optical axis Ax1 to enter the light guide lens 2.

The second entrance face 212 is formed to be substantially a cylindrical face projecting from a periphery of the first entrance face 211 toward the first LED 3. The second entrance face 212 allows the lights, which have larger output angles than the lights entering the first entrance face 211 among the lights emitted from the first LED 3, to enter into the light guide lens 2.

The reflecting surface 213 is formed to be a conic with the top thereof cut off. That is, the reflecting surface 213 has a tapered shape in which the tip of the second entrance face 212 corresponds to the smallest diameter of the reflecting surface 213 and which gradually has a larger diameter (apart from the optical axis Ax1) in a direction parallel with the optical axis Ax1. The reflecting surface 213 internally reflects (totally reflects) the lights which enter into the light guide lens 2 through the second entrance face 212 to be substantially along the optical axis Ax1.

The end portion 21 of the light guide lens 2 is supported by an extension member 12 with the first and second entrance faces 211, 212 exposed toward the first LED 3.

As shown in FIG. 6, in the two LEDs 3 and 4, a second LED 4 (second light source) is arranged close to the front end portion 22 of the lens 2 so as to be disposed rather backward than an extended line of a straight line connecting the front end portion 22 and the back end portion 21. The second LED 4 is mounted on a substrate 42 fixed to a heatsink 41 in a state that an optical axis Ax2 of the LED 4 is directed to a left back direction having an oblique angle of approximately 23 degrees to the right-and-left direction.

At the front end portion 22 of the light guide lens 2, there is provided a focusing section 220 for focusing the light, which is emitted from the second LED 4, within a range of a predetermined angle. The focusing section 220 is backwardly projected from the front end portion 22 to face to the second LED 4. The focusing section 220 includes a first entrance face 221, a second entrance face 222, a reflecting surface 223 and an emitting surface 224.

The first entrance face 221, the second entrance face 222 and the reflecting surface 223 are provided facing to the second LED 4 with the optical axis Ax2 being rotationally-symmetrical axes thereof. The other configurations are the same as the above-mentioned first entrance face 211, the second entrance face 212 and the reflecting surface 213, respectively.

The emitting surface 224 is a surface substantially perpendicular to the optical axis Ax2 and provided opposite to a side where the first entrance face 221, the second entrance face 222 and the reflecting surface 223 are arranged in the focusing section. The emitting surface 224 emits light, which is emitted from the second LED 4 and focused close to the optical axis Ax2 through the first entrance face 221, the second entrance face 222 and the reflecting surface 223, within an angular range of approximately 18 degrees. The angular range of the emitted light is such that the emitted light is illuminated onto the approximately whole length of the back face 24, as described below. More specifically, the angular range is a range within which the light emitted from the second LED 4 and enters the focusing section 220 through the first entrance face 221 is emitted from the emitting surface 224. Accordingly, among the light emitted from the second LED 4, stronger light around the optical axis Ax2 is illuminated onto the approximately whole length of the back face 24.

Moreover, at the tip (back-end) of the focusing section 220, there is provided a locking part 225 projecting backward and is supported by a bracket 13.

As shown in FIGS. 4 and 7, the light guide lens 2 is formed so that a cross-section shape perpendicular to the longitudinal direction thereof is substantially a parallelogram shape or trapezoidal shape having a front face 23 and the back face 24 that are formed substantially along the vertical direction.

The front face 23 is formed to be a long curved plane existing substantially across the whole length of the light guide lens 2, and constitutes an emitting surface for forwardly emitting lights from the first LED 3 and the second LED 4, as described below.

On the other hand, the back face 24 is a surface disposed opposite to the front face 23 and being shorter in the vertical direction than the front face 23. The back face 24 continues to the front face 23 via an upper face and a lower face that are tapered in the sectional view shown in FIG. 7. The thickness of the light guide lens 2 between the back face 24 and the front face 23 is thicker in the back end portion 21 and gradually becomes thinner as nearer to the front end portion 22.

Moreover, the back face 24 has a plurality of lens cut portions 240, 240, ... that are parallely arranged across the whole length of the light guide lens 2 along the longitudinal direction of the light guide lens 2.

FIG. 8 is an enlarged sectional view showing the lens cut portions 240, 240 . . . .

As shown in this FIG. 8, the lens cut portions 240, ... are formed in the shape of saw tooth that are parallely arranged in the longitudinal direction of the light guide lens 2 (back face 24). Each lens cut portion 240 has a sectionally uniform shape along the vertical direction, and has a first prism face 241 arranged in foreside of the longitudinal direction (right side) and a second prism face 242 arranged in backside of the longitudinal direction (left side).

An upstroke portion 241*a* and a tip portion 241*b* of the first prism face 241 are formed to have different functions, respectively. Specifically, the upstroke portion 241*a* internally reflects (totally reflects) the light L1, which is emitted from the first LED 3 and enters the light guide lens 2 through the back end portion 21 (optical entrance 210), to the forward direction of the vehicle. On the other hand, the tip portion 241*b* allows the light L2, which is emitted from the second LED 4 and focused by the focusing section 220, to be refracted and to enter the light guide lens 2.

The second prism face 242 internally reflects (totally reflects) the light L2, which enters the light guide lens 2 through the tip portion 241*b* of the first prism face 241, to the forward direction of the vehicle.

Subsequently, the light emission mode of the vehicle lighting device 1 will be explained.

FIG. 9 is a view showing the optical paths of the light L1 from the first LED 3 and FIG. 10 is a view showing the optical paths of the light L2 from the second LED 4.

As shown in FIG. 9, the light L1 emitted from the first LED 3 of the two LEDs 3 and 4 enters the light guide lens 2 through the optical entrance 210 of the back end portion 21 with being focused along the optical axis Ax1. The light L1 having entered the light guide lens 2 is, directly or indirectly by the internal reflection by the front face 23, guided from the back end portion 21 to the front end portion 22, and internally reflected by the lens cut portions 240 to the forward direction of the vehicle. Specifically, the light L1 is internally reflected by the upstroke portion 241*a* of the first prism face 241 of the lens cut portion 240 to the forward direction of the vehicle (see FIG. 8). As a result, the light L1 is forwardly output from the front face 23, thus the front face 23 emits light forwardly.

Since the thickness of the light guide lens 2 from the back face 24 to the front face 23 is thicker in the back end portion 21 and gradually becomes thinner as nearer to the front end portion 22, the light L1 guided in the light guide lens 2 from the back end portion 21 is guided to a deeper portion (to the front end portion 22) of the curved light guide lens 2 with being internally reflected by the front face 23 with relatively low difficulties.

Moreover, since the optical path length (light guiding length) of the light L1 to the front face 23 is shortened, attenuation of the light L1 guided in the light guide lens 2 is reduced compared with a light guided in a light guide lens having a uniform thickness between front and back faces.

On the other hand, as shown in FIG. 10, the light L2 emitted from the second LED 4 is focused along the optical axis Ax2 through the focusing section 220 to be illuminated onto substantially the whole length of the back face 24 of the light guide lens 2. The light L2 is allowed to enter the light guide lens 2 and is internally reflected to the forward direction by the lens cut portions 240 formed on the back face 24. Concretely, the light L2 is internally reflected to the forward direction by the second prism face 241*b* after entering into the light guide lens 2 through the tip portion 241*a* of the first prism face 241 of the lens cut portions 240 (see FIG. 8). Thereafter, the light L2 is emitted from the front face 23 to the forward direction, thereby the front face 23 emits light to the forward direction.

Accordingly, the lights from the first and second LEDs 3 and 4, which are respectively disposed close to the both end portions in the longitudinal direction of the light guide lens 2, are emitted from the front face 23 of the light guide lens 2 to the forward direction, thereby the front face 23 more strongly emits light to the forward direction.

As described above, according to the vehicle lighting device 1, the light L1 from the first LED 3 that faces to the back end portion 21 of the light guide lens 2 enters the light guide lens 2 through the back end portion 21 and internally reflected by the lens cut portions 240, ... formed on the back face 24 to be emitted from the front face 23 to the forward direction. On the other hand, the light L2 from the second LED 4 disposed close to the front end portion 22 of the light guide lens 2 is emitted to the back face 24 of the light guide lens 2 and refracted by the lens cut portions 240, ... formed on the back face 24 to enter into the light guide lens 2 to be internally reflected forwardly to be emitted from the front face 24 to the forward direction. That is, different from the conventional vehicle lighting device that simply allows the light to enter into the long light guide lens existing along a direction oblique to the front-back direction through the both end portions in the longitudinal direction thereof, the vehicle lighting device 1 according to this embodiment can forwardly emit light L2, which is emitted from the second LED 4 disposed close to the front end portion 22 and is backwardly directed, as well as the light L1 from the first LED 3 disposed close to the back end portion 21 of the light guide lens 2.

Therefore, the vehicle lighting device 1 can make the front face 23 of the long light guide lens 2, existing along a direction oblique to the front-back direction, to forwardly emit light by the lights from the two LEDs 3, 4 arranged close to the both end portions of the light guide lens 2 in the longitudinal direction.

Moreover, since the thickness of the light guide lens 2 between the back face 24 and the front face 23 is thicker in the back end portion 21 and gradually becomes thinner as nearer to the front end portion 22, the light L1 guided in the light guide lens 2 from the back end portion 21 is guided to a deeper portion (to the front end portion 22) of the curved light guide lens 2 with being internally reflected by the front face 23 with relatively low difficulties.

Moreover, since the optical path length (light guiding length) of the light L1 to the front face 23 is shortened, attenuation of the light L1 guided in the light guide lens 2 is reduced compared with a light guided in a light guide lens having a uniform thickness between front and back faces.

Moreover, in the lens cut portion 240, the upstroke portion 241a of the first prism face 241 internally reflects the light L1, which is emitted from the first LED 3 and enters the light guide lens 2 through the back end portion 21, to the forward direction of the vehicle. The tip portion 241b of the first prism face 241 allows the light L2, which is emitted from the second LED 4, to be refracted and to enter the light guide lens 2. The second prism face 242 internally reflects the light L2, which enters the light guide lens 2 through the tip portion 241b of the first prism face 241, to the forward direction of the vehicle. That is, the plurality of different portions (the upstroke portion 241a and the tip portion 241b of the first prism face 241, and the second prism face 242) performs individual function with each other in the lens cut portion 240. Therefore, the plurality of portions can be optimally-designed individually.

The presently disclosed subject matter is not limited to the above descriptions of the embodiment, and can be arbitrarily modified within the scope of the disclosed subject matter.

For example, although the vehicle lighting device 1 is described to be mounted inside the headlamp 10 in the above embodiment, the vehicle lighting device according to the presently disclosed subject matter can be applied to general lighting devices that are mounted on the vehicle, such as a blinker on a side mirror or an interior light, as well as a lighting device mounted inside the taillight.

Moreover, each of the two LEDs 3, 4 may be the one that emits light of a plurality of colors. Specifically, a packaged plurality of light-emitting elements that emit light of different emission colors (for example, red, white or umber) with each other can be applied as the two LEDs 3, 4. The vehicle lighting device 1 can be used as a utility lump that can function as a plurality of kinds of lighting devices (for example, a blinker or a taillight) by using such LEDs 3, 4 and switches the emission color as the need arises.

Moreover, the light guide lens 2 only needs to be arranged along the direction oblique to the front-back direction of the lighting device. For example, the light guide lens 2 may be arranged to be oblique to the backward direction from the lower part to the upper part.

The entire disclosure of Japanese Patent Application No. 2011-183197 filed on Aug. 25, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A vehicle lighting device for use with a vehicle, comprising:
    a first light source and a second light source; and
    a light guide lens that is elongate and extends along a direction oblique to a front-back direction of the vehicle, wherein
    the first light source is arranged to face a back end portion of the light guide lens in a longitudinal direction of the light guide lens,
    the second light source is arranged proximate a front end portion of the light guide lens in the longitudinal direction and backward of an extended line of a straight line connecting the front end portion and the back end portion, such that light emitted from the second light source is illuminated onto substantially the entire length of a back surface of the light guide lens,
    the light guide lens has a plurality of lens cut portions in the back surface thereof, the lens cut portions being arranged parallel with each other in the longitudinal direction,
    the plurality of lens cut portions are formed to internally reflect the light, which is emitted from the first light source and enters into the light guide lens through the back end portion, to a forward direction of the vehicle, and are formed to refract the light, which is emitted from the second light source and enters into the light guide lens to be internally reflected to the forward direction of the vehicle,
    the lens cut portions are formed in the shape of saw teeth that are arranged in parallel with the longitudinal direction of the light guide lens, and have first and second prism faces arranged on a foreside and backside along the longitudinal direction, respectively,
    an upstroke portion of the first prism face is formed to internally reflect the light, which is emitted from the first light source and enters into the light guide lens through the back end portion, to the forward direction of the vehicle,
    a tip portion of the first prism face is formed to allow the light emitted from the second light source to enter into the light guide lens, and
    the second prism face is formed to internally reflect the light, which enters into the light guide lens from the tip portion of the first prism face, to the forward direction of the vehicle.

2. The vehicle lighting device according to claim 1, wherein the light guide lens is formed to have a backward curvature from the front end portion to the back end portion.

3. The vehicle lighting device according to claim 1, wherein a thickness of the light guide lens gets thinner moving from the backend portion to the front end portion.

4. The vehicle lighting device according to claim 1, wherein each of the first and second light sources can emit light of a plurality of colors.

* * * * *